May 18, 1971  L. REH ET AL  3,579,616

METHOD OF CARRYING OUT ENDOTHERMIC PROCESSES

Filed May 5, 1969

Inventors
LOTHAR REH
KARL HEINZ ROSENTHAL
HANS WERNER SCHMIDT

Inventors
LOTHAR REH
KARL HEINZ ROSENTHAL
HANS WERNER SCHMIDT

3,579,616
METHOD OF CARRYING OUT ENDOTHERMIC PROCESSES

Lothar Reh, Bergen-Enkheim, Karlheinz Rosenthal, Neu Isenburg, and Hans Werner Schmidt, Frankfurt am Main, Germany, assignors to Metallgesellschaft Aktiengesellschaft, Frankfurt am Main, Germany
Filed May 5, 1969, Ser. No. 821,773
Claims priority, application Germany, May 30, 1968,
P 17 67 628.7
Int. Cl. F26b *3/08;* F27b *15/00*
U.S. Cl. 263—52                                8 Claims

ABSTRACT OF THE DISCLOSURE

In an endothermic process, raw solids are first dried in a suspension-type heat-exchanger system by hot gas coming from a fluidized-bed furnace with material recycling and then introduced into the fluidized bed. Hot solids taken from the fluidized bed are used in a heat exchanger to preheat fresh air which is used as the fluidizing gas for the fluidized bed. Another portion of air is also heated in the heat exchanger and introduced in the fluidized bed as secondary air.

---

This application is related to copending application Ser. No. 733,891, filed June 3, 1968, by Reh et al. for "Production of Alumina from Aluminum Hydroxide."

This invention relates to a method of carrying out an endothermic process by the fluidization technique.

It is known to carry out endothermic processes in an orthodox fluidized bed. An orthodox fluidized bed is a state of distribution in which a dense phase having a surface like that of a boiling liquid is separated by a distinct jump in density from the superimposed gas or dust space. The solids which are agitated by the gas in the dense fluidized phase occupy about 30–55% of the bed volume. Because the particle size of the solids is never perfectly uniform in practice, the gas will always entrain individual particles, particlarly when they are small in size, so that the gas space above the fluidized bed is not entirely free of solids. The rate at which solids are entrained by the gas will primarily depend on the particle-size distribution and the specific gravity of the solids and on the velocity of flow of the gas. In any case, the solids density is much lower above the fluidized bed that within the bed and in most cases amounts only to a fraction of one percent of the gas volume, as disclosed in British Pat. No. 878,827 and U.S. Pat. No. 2,799,558.

It is also known to dewater and heat powders by a treatment of the powder with hot gases in a dust cloud. A dust cloud is a state of distribution having no defined upper boundary layer and containing gas flowing at a velocity which is much higher than that required to maintain a stationary fluidized bed. Such dust clouds would quickly be depleted of solids by the gas unless new solids were continually added. The solids concentration within the dust cloud is much lower than in an orthodox fluidized bed but much higher than in the dust space over an orthodox fluidized bed. In this case, there is no jump in density between the dense phase and the superimposed dust space but the solids concentration in the dust cloud decreases continuously in an upward direction. The average solids densities above the furnace are usually in the range of about 10–100 kilograms per cubic meter and the solids density may locally increase to as much as 300 kilograms per cubic meter.

In connection with the calcining of fine-grained alumina hydrate, it has been proposed to feed partly predewatered hydrated alumina at a relatively low temperature into the upper portion of a dust cloud and to complete the calcination at 1100–1300° C. In this case, a gas velocity of 1500–3000 standard cubic meters per square meter per hour and a correspondingly high solids content is used so that the density of the suspension of solids decreases upwardly and, on an average throughout the reaction zone, is in excess of 30 kilograms per cubic meter whereas the solids density in the lower portion of the reaction zone amounts to 100–300 kilograms per cubic meter. The solids entrained by the gas are fed to a separator and partly recycled to the lower portion of the dust cloud.

In a fluidized-bed process for producing $Al_2O_3$, the solids are discharged together with the gases at the top of a shaft and are separated from the gases in a separator and partly recycled to the fluidized bed to supply heat to said bed whereas at least part of the heat is supplied by hot gases which are introduced into the fluidized bed above the grate. In this process, a furnace is used in which the shaft is enlarged on the level at which the hot gases are introduced at a temperature of at least 500° C. and at such a velocity that a rapidly expanding fluidized bed is formed, which has no defined upper boundary. The recycled solids are introduced at a point which is disposed above the grate and below the inlet for the hot gases as disclosed in German Pat. No. 1,092,889.

In all processes which have been described above, the heat is not utilized satisfactorily. The various processes also have other disadvantages.

Because many reactants have only a small particle size (about 50–300 microns), the orthodox fluidized bed cannot be maintained unless the fluidizing gas flows at a relatively low velocity. This results in a low throughput per unit area of the grate of the fluidized-bed furnace. It is difficult to superimpose a plurality of orthodox fluidized beds because the dust contained in the exhaust gases from stages which precede in the direction of flow of the gas may clog the grates of the stages which succeed in the direction of flow of the gases and it is difficult to maintain an optimum fluidizing gas velocity in the pretreating zones.

The previously proposed dust-cloud processes are unsatisfactory because it is difficult to effect a uniform combustion of the fuel without overheating effects. Besides, a satisfactory heat economy in a process which comprises a combustion carried out in a combustion chamber outside the furnace can be achieved only if the combustion temperature is high but it is difficult to provide suitable materials resisting such temperatures. This applies particularly to high-temperature processes.

The objects of this invention are to produce an endothermic process which avoids the aforesaid disadvantages.

In general, these objects are obtained by a method of carrying out endothermic processes by the fluidization technique, in which method a major portion of the solids is discharged together with the gases from the top portion of the shaft, part of the heat is supplied to the fluidized bed above the grate by hot gases at a temperature of at least 300° C., and the solids discharged from the top portion of the shaft are separated from the gas in a recycling cyclone and are at least partly recycled into the fluidized bed.

The means by which the objects of this invention are obtained are described more fully with reference to the accompanying schematic drawings in which.

Figure 1:
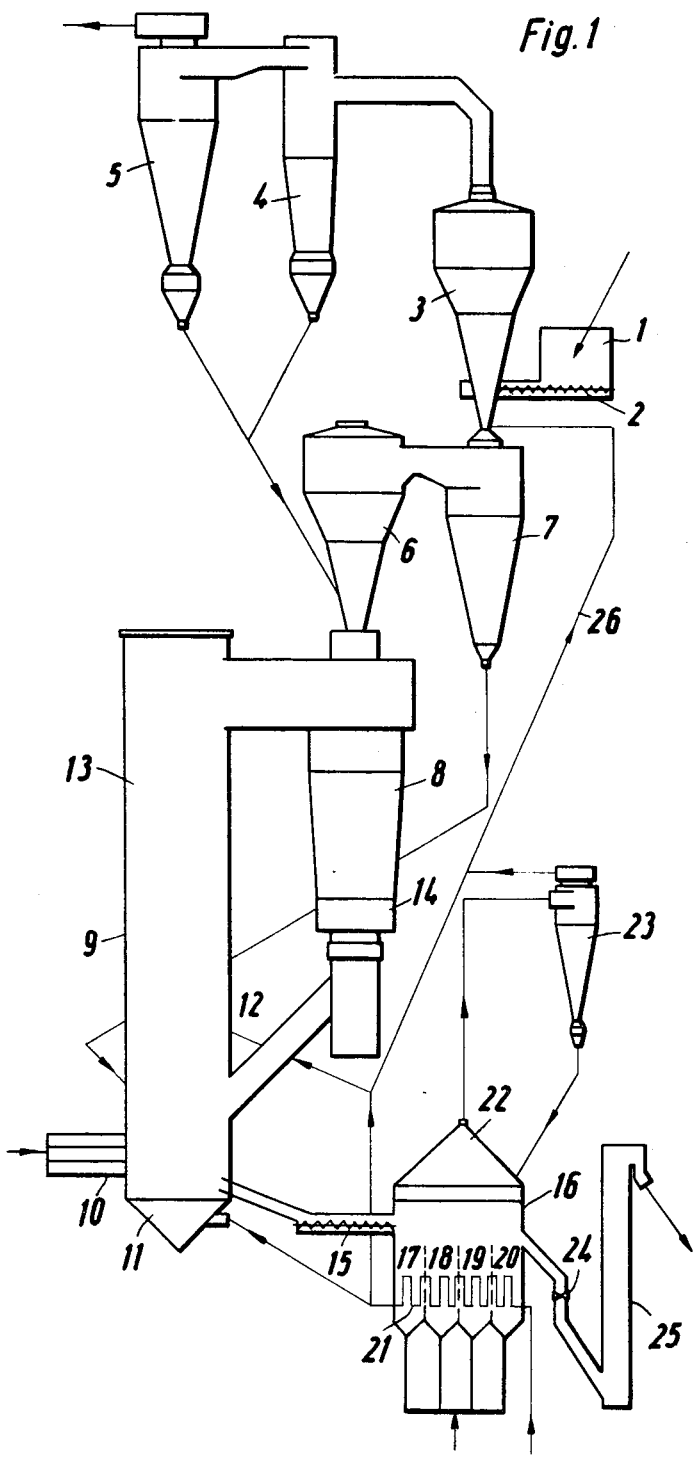
FIG. 1 is a diagrammatic view of the apparatus.

As shown in FIG. 1, the raw material solids pass from bin 1 by way of screw conveyor 2 into a first venturi drier 3 forming a part of a multi-stage suspension-type drying phase including the following cyclone separators 4 and 5. The process is characterized in that the solids are pre-dewatered and/or heated in a multi-stage suspension heat exchanger 3, 4, 5, 6, and 7, which is operated with the exhaust gases of the fluidized-bed furnace 9 and is passed through a separator 7, fed to the fluidized-bed furnace 9 together with at least part of the solids which are withdrawn from the reaction zone, which is at a temperature of 500–1200° C., and separated in a recycling cyclone 8; the reaction product is withdrawn from the cycle which includes the fluidized-bed furnace 9 and the recycling cyclone 8, and is charged to a fluidized-bed cooler 16, which comprises cooling registers 21 provided in the bed and operated with air as a fluidizing gas and as a coolant for the cooling registers 21. At least part of the heated cooling air discharged from the cooling registers is supplied to the fluidized-bed furnace 9 as a fluidizing gas, any part which is not used as a fluidizing gas or at least part of the heated fluidizing-gas discharged from the fluidized-bed cooler 16 is supplied as secondary air to the fluidized-bed furnace 9 in a zone 12 spaced above the grate 11 by a distance which is about 0.3–1.5 times of the pressure drop in millimeters of water which has been adjusted in the fluidized bed in the furnace shaft, the cooling air which is discharged from the fluidized-bed cooler 16 and supplied to the fluidized-bed furnace 9 as fluidizing gas and secondary air is divided in a ratio of 1:2 to 5:1 and the heat required for the reaction is supplied by fuel charged through pipe 10 into the reaction zone, except for the production of anhydrous alumina from aluminum hydroxide.

The method according to this invention can preferably be applied to:

(1) Processes for dewatering crystalline inorganic compounds, such as magnesium hydroxide and iron hydroxide;

(2) Calcining and cracking processes, involving, e.g., lime, dolomite, certain kinds of raw cement powder, iron sulfate;

(3) Reducing processes, e.g., the reduction of gypsum; and (4) Chemical processes carried out at high temperature, e.g., the oxidation of ilmenite.

In many cases, the processes stated above are carried out in combination rather than separately. For instance, calcining and reducing processes will usually be combined with dewatering processes, particularly when the solids fed to the process are still wet after a filtering operation. An example of dewatering and calcining processes carried out at the same time is the calcination of phosphate.

The pressure drop in the furnace shaft is a function of the solids content and also controls the residence time. This pressure drop is within the range of 400–5000 millimeters of water.

The state of distribution of the solids in the fluidized-bed furnace is controlled by the division of the air which is required to burn the fuel. The fluidizing air which is supplied through the grate produces a highly agitated, fluidized bed having a solids concentration in a range of about 5–35% of the total volume. The supply of secondary air on a desired level into the furnace shaft, which is cylindrical or may have an enlarged upper portion, results in the shaft above the secondary air inlet in the formation of a dust cloud, in which the solids concentration continuously decreases from the above-mentioned values down to about 0.05% at the gas outlet. An average solids concentration of about 0.5–15% is obtained and will depend on the circulation of solids within the furnace.

The hot solids which are discharged from the shaft furnace at a temperature of 500–1200° C. together with the combined combustion gas stream are separated in a recycling cyclone. At the same temperature, the exhaust gases from the recycling cyclone enter a multi-stage suspension heat exchanger system, where the moisture of the supplied solids is removed and the heat content of the exhaust gases is utilized to a large extent for this purpose. The suspension heat exchangers consist preferably of venturi-type fluidized-bed driers; in this case each venturi-type fluidized-bed drier and an associated cyclone form a drying stage. The use of venturi-type fluidized-bed driers is advantageous because they can be operated conveniently and have a high thermal efficiency and enable an adjustment of an adequate average solids-residence time in a range from several seconds to several minutes.

The raw solids are fed to the last venturi-type fluidized-bed drier in the gas flow path from the fluidized-bed furnace. A suspension is formed, which is discharged upwardly and received by a cyclone. The separated solids are charged into the venturi-type drier which precedes the cyclone in the gas-flow path, and through another separator are fed to the lower portion of the fluidized-bed furnace.

The use of a two-stage venturi system enables a reduction of the temperature of the exhaust gases to the dew point.

The reaction product which is separated in the recycling cyclone is entirely or partly recycled into the fluidized bed of the fluidized-bed furnace. The product of the process is taken in a controlled manner from the recycling cyclone or at another suitable point, e.g., the fluidized-bed furnace and is supplied to a fluidized-bed cooler.

The solids are cooled in the fluidized-bed cooler with cold air, which is divided into two streams serving for direct and indirect heat exchange operations. For the direct heat exchange, air is used as a fluidizing gas, and for the indirect heat exchange air is used as a coolant flowing through cooling registers disposed in the fluidized bed.

The fluidized-bed cooler is suitably divided along the solids-flow path into a plurality of chambers so that the air passed through the cooling registers flows opposite to the hot solids, and the fluidizing air used in the fluidized-bed cooler flows in a cross-current.

The partial streams which have thus been heated are separately supplied to the system. At least part of the indirectly heated air which has flown through the cooling registers of the fluidized-bed cooler serves as fluidizing air in the fluidized-bed furnace. Any remainder of the indirectly heated air and the fluidizing air which is heated by a direct heat exchange with the solids to be cooled are supplied to the fluidized-bed furnace as secondary air. Any remaining streams of the directly or indirectly heated air may be supplied to a third point of the system, e.g., as afterburning air or as drying air. This gas-flow pattern has the advantage that the fluidizing gas intended for the fluidized-bed furnace is free of dust so that a clogging of the grate is reliably avoided. After the removal of dust in a cyclone, no difficulty will result from the dust still contained in the gases to be used as secondary air because the means for supplying the secondary air are not easily deranged.

The cooling air is usually divided at a ratio of 1:2 to 5:1 for use in indirect and direct heat exchange operations; this ratio may be selected in view of the conditions of operation in the reactor.

It will be desirable to supply part of the heated cooling air which flows out of the fluidized-bed cooler into the last suspension heat-exchange stage in the gas flow path so that a cooling of the exhaust gases below the dew point is avoided. This measure will also prevent an excessively high gas-flow rate in the fluidized-bed furnace.

To remove residual heat from the product, the cooling with air may be supplemented by an indirect cooling with water in a final stage. In this case, cooling is preferably effected within the cooler itself. This embodiment of the method of this invention will be used particularly when the heat content of the reaction product exceeds the quantity of heat which can be taken up by the air that is used in the process.

Any desired fuels, such as coal, fuel oil and fuel gas, can be used to supply the energy which is required.

If the method of this invention is carried out to produce a reaction product of high purity, ash-free fuels will be used which can be introduced into the zone between the grate and the secondary-air inlet. Suitable ash-free fuels are liquid and gaseous hydrocarbons. In processes such as dewatering, calcining or cracking processes, the ratio between the combustion air, which is supplied to the fluidized-bed furnace as fluidizing gas and secondary air, and the fuel is selected so that the excess air amounts to 0–40%, preferably 5–10%. The required fuel-air ratio is adjusted in processes carried out in a reducing atmosphere. In this case, the gases leaving the recycling cyclone contain combustible constituents, which are suitably afterburned before they enter the first suspension heat exchanger in the gas flow path.

The method of this invention enables the production of reaction products having a uniform quality at high throughputs per unit of grate area and with a low specific heat consumption without difficulty in the operation of the furnace, such as may be caused by a clogging of the furnace and a flushing of the solids.

EXAMPLE 1

(With reference to FIG. 1)

Phosphate rock was to be calcined at a temperature of about 900° C., which was maintained as constant as possible, to condition the phosphate for a wet separation. This process involves a transformation of $CaCO_3$ into $CaO$.

From the feed hopper 1, 6.7 metric tons of Moroccan phosphate rock having an ignition loss of 12% and containing 15% combined water near the surface and having a particle size distrbiution of 5.29% above 1 millimeter
28.3% above 250 microns
54.9% above 160 microns
72.2% above 100 microns
89.0% above 53 microns was charged by the conveyor 2 into the second venturi-type drier 3 in the gas-flow path and was entrained by the exhaust-gas stream coming from the first venturi-type drying stage 6, 7 in the gas flow path and having a temperature of 450° C. and the cooler air which was not required in the furnace and was supplied through the conduit 26 at a point between the two venturi stages at a rate of 2140 standard cubic meters per hour and 500° C. The combined water near the surface of the particles was almost completely driven off before the solids were removed from the gas-solids stream in the cyclone 4 and in the fine purification cyclone 5. For the final purification of the gas, the exhaust gas entered a venturi-type scrubber at a temperature of about 100° C., which is just above the dew point. The solids which were separated in cyclones 4 and 5 entered the venturi-type fluidized-bed drier 6, where they were entrained by the gas stream which left cyclone 8 for recycling the fluidized-bed solids. This gas stream was at about 900° C. and heated the solids to about 450° C. The gas-solids stream was again separated in the cyclone 7. The de-watered material fell through a downcomer into the fluidized-bed furnace 9. The exhaust gas entered the fluidized-bed drier 3.

The fluidized-bed furnace had an inside diameter of 1.0 meter and an inside height of 8 meters. About 0.2 meter above the grate, 150 kilograms/hour of bunker C oil were charged through pipe 10 into the fluidized bed, which was dense at this point. Air was supplied through the grate 11 at a rate of 1200 standard cubic meters per hour. Secondary air was supplied at a level which was about 1.8 meters above the grate at a rate of 510 standard cubic meters per hour. The two air streams had been heated to 500° C. by an indirect heat exchange in the fluidized-bed cooler. The ratio of the fluidizing air to the secondary air was about 2.35:1.

As a result of an internal circulation of solids, the concentration of solids in the upper zone 13 of the furnace decreased continuously to about 3 to 8 kilograms per cubic meter. With this concentration, the suspension entered the recycling cyclone 8, where the material was separated.

The separated phosphate was completely recycled into the fluidized-bed furnace by a suitable device 14. By means of a conveyor unit 15, the product was withdrawn from the fluidized-bed furnace 9 and charged into a fluidized-bed cooler 16. The discharge was controlled to maintain in the furnace a pressure drop of 2500 millimeters water.

A fluidized-bed having an exactly defined surface was produced in the fluidized-bed cooler, which was divided into four chambers in the direction of solids flow. In the fluidized-bed cooler, the matter discharged from the furnace at a rate of 5.55 metric tons per hour was cooled to 200° C. by simultaneous indirect and direct-heat-exchange operations. 1850 standard cubic meters of air per hour were conducted countercurrent to the solids through a tube-bank system 21 suspended in the chambers and were thus heated to 500° C. 1200 standard cubic meters of this dust-free air per hour were supplied as fluidizing air through the grate 11, and 510 standard cubic meters per hour were supplied as secondary air at zone 12 into the fluidized-bed furnace 9. 140 standard cubic meters per hour were combined with the air which had been used as a fluidizing gas in the cooler 16 and directly heated therein to 500° C., followed by a dust removal in a cyclone 23. The air streams thus combined are supplied through a conduit 26 directly into the second drying stage 3, 4, 5 in the gas-flow path. The solids leaving the fluidized-bed cooler 16 are discharged through a star lock valve 24 and a bucket elevator 25.

The process described hereinbefore and carried out with a complete, ash-free combustion and an air excess of 5% gives the following results:

(1) The calcination temperature can be very uniformly adjusted to a value of 900° C.±10° C., which is constant throughout the calcination cycle;

(2) The circulating fluidized-bed solids amount to 1.8 metric tons so that an average solids residence time of 20 minutes can be adjusted;

(3) The specific heat consumption is about 285 kilocalories per kilogram of calcine; and (4) A high throughput of 160 day-tons per square meter of the shaft cross-section is obtained.

EXAMPLE 2

Figure 2:
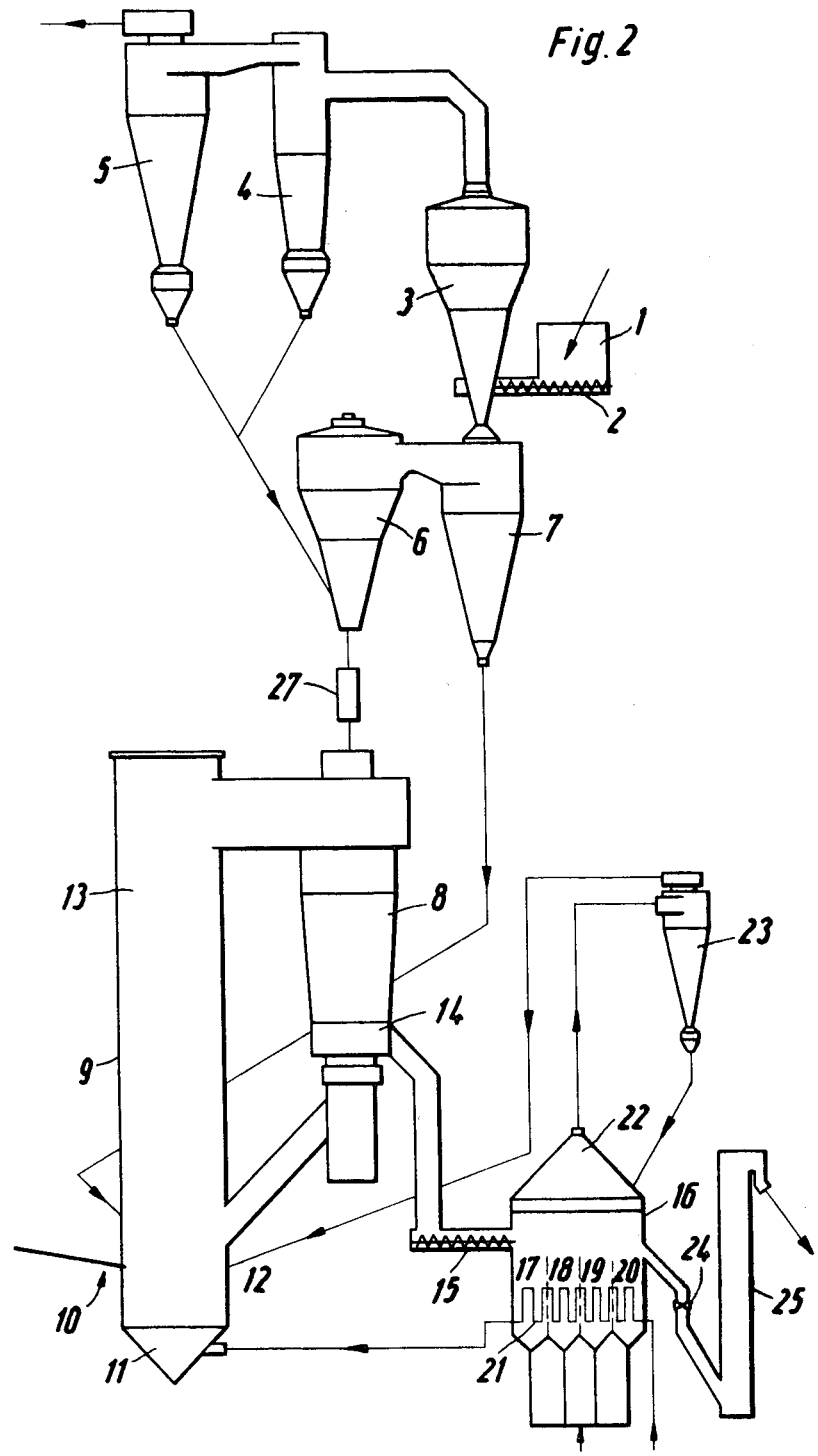
FIG. 2 is a similar view of a modification of the apparatus.

(With reference to FIG. 2)

This example illustrates the production of CaS from gypsum which is wet from a filtering operation and had been obtained in the production of phosphoric acid.

By means of a feed hopper 1, gypsum which had been obtained in the production of phosphoric acid and which was wet from a filtering operation and contained 20% mechanically combined water was fed at a rate of 12.5 metric tons per hour by means of a feed-screw conveyor 2 into the second venturi-type drier 3 in the gas-flow path and was entrained by the exhaust-gas stream coming from the first drying stage in the gas-flow path and was at a temperature of about 700° C. Before the gas-solids stream was separated in the two succeeding cyclones 4, 5, the entire mechanically combined water had been removed and the gypsum had been dewatered to form approximately a hemihydrate. The exhaust gas leaving the cyclone 5 at 200° C. was supplied to a fine purifying apparatus, not shown, for a removal of dust.

The solids leaving the cyclones 4 and 5 entered the venturi-type fluidized-bed drier 6 and were entrained therein by the gases which had been discharged from the recycling cyclone 8 and afterburned in unit 27. In entering the drier 6, these gases had a temperature of about 1200° C.

In this operation, water of crystallization was removed from the solids having a particle size of Above— Percent
 90 microns _____ 10
 60 microns _____ 35
 40 microns _____ 60
 20 microns _____ 78
 10 microns _____ 90 and the solids were heated to 700° C. The gas-solids stream was again separated in cyclone 7. The dewatered solids entered the fluidized-bed furnace 9. The exhaust gas was supplied to the above-mentioned fluidized-bed drier 3.

In the fluidized-bed furnace 9 having an inside diameter of 2 meters and an inside height of 12 meters, the calcium sulfate was reduced in accordance with equation $$CaSO_4 + 2CO + 2H_2 \rightarrow CaS + 2H_2O + 2CO_2$$

in the simultaneous presence of steam. 2.5 metric tons/ hour of coal containing 85% carbon and having a particle size of 90% below 300 microns were used as a reducing agent and fuel and charged through pipe 10 on the level on which secondary air was supplied. Of the air required at a rate of 6000 standard cubic meters per hour to suspend the fluidized-bed solids, 80% were supplied through the grate 11 as a fluidizing gas and 20% were supplied at zone 12 on a level 1.5 meters above the grate as secondary air.

The temperature in the fluidized-bed furnace 9 was at 1000–1050° C. and was constant throughout the cycle.

In the upper zone 13 of the furnace, the internal recirculation of solids resulted in a continuous decrease in solids concentration to a value of about 3 to 8 kilograms per cubic meter. The suspension having this concentration entered the recycling cyclone 8, where the gas and solids were separated.

The separated solids were partly returned through a suitable device 14 into the fluidized-bed furnace 9 and partly charged by a conveyor unit 15 into a fluidized-bed cooler 16. The rate at which solids were charged into the fluidized-bed cooler was controlled to maintain a pressure drop of 1800 millimeters water in the fluidized-bed furnace.

The fluidized-bed cooler had four chambers 17, 18, 19, 20 and received solids at a rate of 5 metric tons per hour. These solids were cooled below 200° C. by simultaneous direct and indirect heat exchange operations involving air. For this purpose air at a rate of 4800 standard cubic meters per hour was passed countercurrent to the solids through a tube bank system 21, which was suspended in the chambers 17, 18, 19, 20. The air was thus heated to 300° C. A second air stream at a rate of 1200 standard cubic meters per hour served in the cooler as fluidizing air and left the several chambers through hood 22. The combination of the streams leaving hood 22 resulted in an air stream having a temperature of 350° C. The dust-free air which had been passed through the tube bank system 21 of the cooler was passed through grate 11 to fluidized-bed furnace 9. Dust was removed in cyclone 23 from the air which had been used for fluidization and heated in the fluidized-bed cooler 16, and this air was then blown into the fluidized-bed furnace 9 as secondary air at zone 12.

The solids leaving the fluidized-bed cooler 16 were carried off by a star-lock valve 24 and a bucket elevator 25.

The gases which left the recycling cyclone 8 were at a temperature of 1050° C. and contained reducing constituents and were burned in a brick-lined afterburner unit 27, into which 700 standard cubic meters of air per hour were radially injected. The resulting gases were at a temperature of 1200° C. and entered the venturi-type fluidized bed drier 6.

Having now described the means by which the objects of this invention are obtained, we claim:

1. In a method of carrying out endothermic processes by the fluidization technique, comprising the steps of discharging a major portion of the solids together with the gases from the top portion of the shaft of a fluidized-bed furnace, supplying a part of the heat to the fluidized bed above the grate of the fluidized-bed furnace by hot gases at a temperature of at least 300° C., and separating the solids discharged from the top portion of the shaft of the fluidized-bed furnace from the gas in a recycling cyclone and at least partly recycling them into the fluidized bed, the improvement comprising the steps of drying and heating the solids to be subjected to the process in a multi-stage suspension heat exchanger operated with the exhaust gases of the fluidized-bed furnace and pass through a separator and fed to the fluidized-bed furnace together with at least part of the solids withdrawn from the reaction zone, at a temperature of 500° to 1200° C., and separating the solids in a recycling cyclone;

withdrawing the reaction product from the cycle which includes the fluidized-bed furnace and the recycling cyclone, and charging the solids to a fluidized-bed cooler, having cooling registers provided in the bed and operated with air as a fluidized gas and as a coolant for the cooling registers;

supplying at least part of the heated cooling air discharged from the cooling registers to the fluidized-bed furnace as a fluidizing gas;

supplying any part of the heated cooling air which is not used as at least a component of the fluidizing gas discharged from the fluidized-bed cooler as secondary air to the fluidized-bed furnace in a zone spaced above the grate by a distance which is about 0.3 to 1.5 times of the pressure drop in millimeters of water which has been adjusted in the fluidized-bed in the furnace shaft; dividing the cooling air which is discharged from the fluidized-bed cooler and supplied to the fluidized-bed furnace as fluidizing gas and secondary air in a ratio of 1:2 to 5:1; and supplying the heat required for the reaction by fuel charged through a pipe into the reaction zone, except for the production of anhydrous alumina from aluminum hydroxide.

2. A process as in claim 1, in which the solids to be subjected to the process are predewatered and/or heated in a two-stage venturi-type fluidized-bed drier.

3. A process as in claim 1, in which the reaction product is cooled in a fluidized-bed cooler having several compartments and moved through by countercurrents of solids and air, respectively, which air is indirectly heated.

4. A process as in claim 3, in which that part of the heated cooling air leaving the fluidized-bed cooler is supplied to the last suspension heat-exchanger stage in the gas-flow path.

5. A process as in claim 4, in which the reaction product which has been cooled with air is indirectly cooled with water in a final stage.

6. A process as in claim 1, in which the heat required for the reaction is supplied by ashfree fuels charged a pipe into the zone between the grate and the secondary air inlet.

7. A process as in claim 1, in which for endothermic processes using reducing gases in the reaction cycle, afterburning is effected between the output of the recycling cyclone and the input of the first suspension-type heat exchanger in the gas-flow path.

8. A method of effecting treatment of a particulate solid, comprising the steps of:
(a) maintaining a fluidized bed above a gas-traversible grate;
(b) drying and heating said particulate solids by
($b_1$) withdrawing from above said fluidized bed at least a portion of an exhaust gas formed in said fluidized bed,
($b_2$) separating solids from the exhaust gas withdrawn from said fluidized bed in step ($b_1$) and returning the separated solids to said fluidized bed with said particulate solids, (b₃) treating the particulate solids with the exhaust gas from which solids have been separated in step (b₂) to dry and heat the particulate solids, and (b₄) thereafter introducing the particulate solids of step (b₃) into said fluidized bed;

(c) withdrawing from said fluidized bed a particulate treated product;

(d) fluidizing said product with a first portion of cooling air and transferring sensible heat from the fluidized product by indirect heat exchange to a second portion of cooling air, the air of both said portions being heated;

(e) introducing part of said heated air through said grate in said fluidized bed and introducing the remainder of the heated air into said fluidized bed at a location spaced above the grate by about 0.3 to 1.5 times the pressure drop across said fluidized bed in millimeters of water, said part of said heated air being in a volume ratio to said remainder of said heated air of substantially 1:2 to 5:1; and (f) additionally heating said fluidized bed by combusting a fuel therein.

References Cited

UNITED STATES PATENTS

| | | | |
|---|---|---|---|
| 2,529,366 | 11/1950 | Bauer | 34—10 |
| 3,441,258 | 4/1969 | Gieskieng | 34—10 |

JOHN J. CAMBY, Primary Examiner

U.S. Cl. X.R.

34—10